United States Patent
Pellar (10) Patent No.: US 7,430,318 B2
(45) Date of Patent: Sep. 30, 2008

(54) SYSTEM AND METHOD FOR COLOR CORRECTION FOR ELECTRONIC PRINTING

(75) Inventor: Ronald J. Pellar, Orange, CA (US)

(73) Assignees: Toshiba Corporation (JP); Toshiba Tec KabushikiKaisha (JP)

( * ) Notice: Subject to any disclaimer, the term of this patent is extended or adjusted under 35 U.S.C. 154(b) by 906 days.

(21) Appl. No.: 10/890,334

(22) Filed: Jul. 13, 2004

(65) Prior Publication Data

US 2006/0013477 A1    Jan. 19, 2006

(51) Int. Cl.
    *G06K 9/00* (2006.01)
(52) U.S. Cl. ...................... 382/167; 382/274
(58) Field of Classification Search ............ 382/162, 382/167, 274; 358/518–519
    See application file for complete search history.

(56) References Cited

U.S. PATENT DOCUMENTS

| | | | |
|---|---|---|---|
| 4,819,193 A | 4/1989 | Imao | |
| 4,853,768 A | 8/1989 | Suzuki et al. | |
| 4,929,978 A | 5/1990 | Kanamori et al. | |
| 4,959,712 A | 9/1990 | Tsuzuki et al. | |
| 4,975,769 A | 12/1990 | Aizu et al. | |
| 5,132,788 A | 7/1992 | Hirota | |
| 5,189,521 A | 2/1993 | Ohtsubo et al. | |
| 5,202,756 A | 4/1993 | Sasaki et al. | |
| 5,278,640 A | 1/1994 | Aizu et al. | |
| 5,398,109 A | 3/1995 | Amakawa et al. | |
| 5,414,537 A | 5/1995 | Omuro et al. | |
| 5,422,738 A | 6/1995 | Ishihara et al. | |
| 5,539,522 A | 7/1996 | Yoshida | |
| 5,564,006 A | 10/1996 | Reed | |
| 5,581,298 A | 12/1996 | Sasaki et al. | |
| 5,608,549 A | 3/1997 | Usami | |
| 5,689,349 A | 11/1997 | Plettinck et al. | |
| 5,710,871 A | 1/1998 | Tadenuma et al. | |
| 5,726,682 A | 3/1998 | Lum et al. | |
| 5,754,316 A | 5/1998 | Hayashi et al. | |
| 5,790,261 A | 8/1998 | Hayashi et al. | |
| 5,805,313 A | 9/1998 | Hayashi et al. | |
| 5,809,366 A | 9/1998 | Yamakawa et al. | |
| 5,881,211 A | 3/1999 | Matsumura | |

(Continued)

*Primary Examiner*—Duy M Dang
(74) *Attorney, Agent, or Firm*—Tucker Ellis & West LLP (57) ABSTRACT

This invention is directed to a system and method for setting output characteristics of an image rendering device. Image data encoded relative to a red-green-blue color space is received in a vector format D, such that each value of D corresponds to a red component value, a blue component value and a green component value. Data representing a contrast adjustment matrix C is then received, such that the values of the matrix C are constant values associated with a selected contrast adjustment for the image data. Data representing a saturation adjustment matrix S is then received, such that the values of the matrix S are constant values associated with a selected saturation adjustment for the image data. The values of the matrix S also correspond to values of a selected m by n masking matrix A. A brightness adjustment matrix B is then received. The values of the brightness adjustment matrix B are associated with brightness adjustment of the red component, with brightness adjustment of the green component, and with brightness adjustment of the blue component. An output image data D' is then calculated, encoded in a vector format, such that $D'=S\times C\times D+B$.

26 Claims, 2 Drawing Sheets

U.S. PATENT DOCUMENTS

| | | |
|---|---|---|
| 5,930,009 A | 7/1999 | Sato et al. |
| 5,956,044 A | 9/1999 | Giorgianni et al. |
| 6,002,498 A | 12/1999 | Haraguchi et al. |
| 6,021,255 A | 2/2000 | Hayashi et al. |
| 6,097,501 A | 8/2000 | Hayashi et al. |
| 6,118,549 A | 9/2000 | Katougi et al. |
| 6,134,029 A | 10/2000 | Granger |
| 6,160,912 A | 12/2000 | Usami |
| 6,262,817 B1 | 7/2001 | Sato et al. |
| 6,271,934 B1 | 8/2001 | Hayashi |
| 6,621,604 B2 | 9/2003 | DeLean |
| 6,683,981 B1 | 1/2004 | Matama |
| 2003/0098983 A1 | 5/2003 | Terada |
| 2004/0057060 A1 | 3/2004 | Johannesson et al. |

SYSTEM AND METHOD FOR COLOR CORRECTION FOR ELECTRONIC PRINTING

BACKGROUND OF THE INVENTION

This invention is directed to a system and method for performing color corrections on color image data. More particularly, this invention is directed to a system and method for setting output characteristics of an image rendering device. This invention is particularly useful in improving color quality and color fidelity with regards to color saturation, contrast and brightness on data that is to be output on an image processing apparatus.

The color output of an electronic printer, copier, or other document processing device requires pre-adjustment based upon calibration/characterization data. The calibration/characterization data is used to improve the output quality and color fidelity with regards to color saturation, contrast and brightness.

Saturation is the intensity of a color, from neutral gray through pastel to saturated color, in a given color space model. Color saturation control is a process by which the amount of color in an image is increased or decreased without affecting the contrast of the image. For example, when saturation is lowered, the amount of white in an image is increased, giving the image a washed-out appearance. Thus, adjusting the color saturation can result in an image that is black-and-white or has very strong colors. Adjustment of the saturation of an image is typically accomplished by converting the Red-Green-Blue, or RGB color values to a luminance-chrominance color space. Once converted, the saturation is increased within the luminance-chrominance color space. The saturated image is then converted back to RGB color values reflecting the adjusted saturation levels. This technique, however, can result in a saturated image lacking the proper hue. For example, the hue, or saturation relationship in all colors, may get too red. Earlier attempts to compensate for the improper hue included the use of a different color space, i.e., not luminance-chrominance, using masking equations in density space for a default printer setup, or using multi-dimensional lookup tables. These methods, however, fail to adequately provide ease of user adjustment to saturation levels.

Contrast is the rate of change of the gray values of the intensity of color, brightness, or shading of an area occupied by a display element, group or image and the intensity of an area not occupied by a display element, group or image. Stated another way, contrast is the range of optical density and tone on a photographic negative or print (or the extent to which adjacent areas on a television screen differ in brightness). Adjustment of contrast settings by a user has also met with difficulties. The traditional contrast adjustment was accomplished using a gamma function implemented as a lookup table or as a mathematical exponential. For performance reasons, the lookup table is preferable, however a lookup table is an exceedingly awkward technique for contrast adjustment by a user.

Brightness is an attribute of visual perception in which a source appears to emit a given amount of light. Brightness adjustment, as opposed to contrast and saturation adjustment, is suitably accomplished using a multiplicative constant applied in RGB or Cyan-Magenta-Yellow color. As previously noted, adjustment of saturation, contrast and brightness by a user when using the aforementioned techniques is awkward, ineffective, or both.

By way of background, a color space is typically a particular model of colors, represented by a tri-dimensional map. For each of three broad classes of color related devices, a series of base algorithmic models are described that perform a transformation between color spaces. The models provide a range of color quality and performance results equating to different trade-offs in memory footprint, performance and image quality. The device device-dependent and device-independent color spaces are typically divided into three basic families, CIEXYZ, RGB and Cyan-Magenta-Yellow, or CMY. It should be noted that a subset of the CIEXYZ spaces are also defined as connection spaces.

The CIELAB color space gets its name from a color space that uses three values to describe the precise three-dimensional location of a color inside a visible color space. "CIE", or Commission Internationale de l-Eclairages, is an international body of color scientists whose standards make it possible to communicate color information accurately "L" describes relative lightness, "A" represents relative redness-greenness, and "B" represents relative yellowness-blueness. The CIEXYZ structure contains the X, Y, and Z coordinates of a specific color in a specified color space.

A color model that describes each color in terms of the quantity of each secondary color, cyan, magenta, yellow, and black is commonly referred to as the CMYK color model. The CMYK system is used for printing. For mixing of pigments, it is better to use the secondary colors, since they mix subtractively instead of additively. The secondary colors of light, cyan, magenta and yellow, correspond to the primary colors of pigment (blue, red and yellow). In addition, although black could be obtained by mixing these three in equal proportions, in four-color printing, black is typically used as a separate colorant. The K in CMYK stands for 'Key' or 'blacK,' so as not to cause confusion with the B in RGB (Red, Green, Blue) color model.

As will be known in the art, the difference between the two color models is based on how color is produced. Red, green, and blue are projected light and cyan, magenta, yellow, and black are reflected light. Combining varying amounts of red, green and blue will faithfully create the spectrum of colors. By varying the amounts of red, green and blue, an image may be projected onto the phosphors of a monitor or television screen. However, pigments added to paper, successively, will darken the paper. Using selective light colors will recreate the spectrum on white paper. Thus, cyan will absorb red, magenta will absorb green and yellow will absorb blue. These are called the subtractive primary colors, or secondary colors. Because of the lightness of cyan, magenta and yellow, black, is used for the gray components.

Often the color conversion from one color space to a second color space is not flawless and there are errors in the quality, intensity, lightness, or other features of the second color-space. For example, the CMYK printing materials for use in an image processing apparatus are not perfectly complementary colors of RGB, and will often generate solid blue colors that contain too much purple color.

Thus, there exists a need for a method and system for a user to adjust saturation, contrast and brightness without detrimentally affecting other portions of the image. There exists a need for a method and system of saturation, contrast and brightness adjustment by a user that is independent of the calibration of a document processing device.

The subject invention remedies the aforementioned problems and provides a method for a user to easily adjust the saturation, contrast and brightness of an image.

SUMMARY OF THE INVENTION

In accordance with the present invention, there is provided a system and method which performs color corrections on image data.

In accordance with the present invention, there is provided a system and method which enables the saturation, contrast and brightness adjustment by a user that is independent of the calibration of a document processing device.

Further, in accordance with the present invention, there is provided a system for setting output characteristics of an image rendering device. The system includes means adapted for receiving image data in a matrix D that is encoded relative to a red-green-blue color space. The system also includes means adapted for receiving data representing a contrast adjustment matrix C. The values of the contrast adjustment matrix C are constant values associated with a selected contrast adjustment. The system further includes means adapted for receiving data representing a saturation adjustment matrix S. The values of the saturation adjustment matrix S are constant values associated with a selected saturation adjustment. The values of the saturation adjustment matrix S also correspond to values of a selected m by n masking matrix A. The system further includes means adapted for receiving data representing a brightness adjustment matrix B. The values of the brightness adjustment matrix B correspond to values associated with a brightness adjustment of a red component, a blue component and a green component. The system includes calculation means for outputting image data D' encoded in a vector format. The image data $D' = S \times C \times D + B$.

In one embodiment, the system further includes means adapted for outputting the image data D'. In another embodiment, the values of the contrast adjustment matrix C are defined as $C_X = C_{XC} + C_U$, wherein $C_{XC}$ is a calibration constant and $C_U$ is a user adjustment value. In another embodiment, the values of the contrast adjustment matrix C are defined as $C_X = C_{XC} \times C_U$, wherein $C_{XC}$ is a calibration constant and $C_U$ is a user adjustment value. In one embodiment, the values of the saturation matrix S are defined as $S_X = S_{XC} \times S_U$, wherein $S_{XC}$ is a calibration constant and $S_U$ is a user adjustment value. In another embodiment, the values of the brightness matrix B are defined as, $B_R = B_{RC} + B_{RU}$, $B_G = B_{GC} + B_{GU}$, and $B_B = B_{BC} + B_{BU}$, wherein $B_{RC}$ is a calibration constant and $B_{RU}$ is a user adjustment value, wherein $B_{GC}$ is a calibration constant and $B_{GU}$ is a user adjustment value, and wherein $B_{BC}$ is a calibration constant and $B_{BU}$ is a user adjustment value.

Still further, in accordance with the present invention, there is provided a system for setting output characteristics of an image rendering device. The system includes means adapted for receiving image data vector D having a length n, and encoded relative to selected color space having n components. The system further includes means adapted for receiving data representing a selected n by n contrast adjustment matrix C. Means adapted for receiving data representing a selected n by n saturation adjustment matrix S are also included in the system. Further, the system includes means adapted for receiving data representing a selected brightness adjustment vector B having a length of n. The system also comprises calculation means for outputting image data D' such that $D' = S \times C \times D + B$.

In a preferred embodiment, the image rendering device is a printer, a scanner, a copier or a multifunction peripheral device. In another embodiment, the system also includes means adapted for outputting the image data D'. In a preferred embodiment, the values of the matrix S include a calibration constant and a user adjustment value. In another embodiment, the values of the matrix C include a calibration constant and a user adjustment value. In a preferred embodiment, the values of the matrix B include a calibration constant and a user adjustment value.

Still further, in accordance with the present invention, there is provided a method for setting output characteristics of an image rendering device. The method begins by receiving image data encoded relative to a red-green-blue color space. The image data is in a vector format D, such that each value of D corresponds to a red component value, a blue component value and a green component value. Data representing a contrast adjustment matrix C is then received, such that the values of the matrix C are constant values associated with a selected contrast adjustment for the image data. The method includes the step of receiving data representing a saturation adjustment matrix S, such that the values of the matrix S are constant values associated with a selected saturation adjustment for the image data. The values of the matrix S also correspond to values of a selected m by n masking matrix A. Data representing a brightness adjustment matrix B is then received. The values of the brightness adjustment matrix B are associated with brightness adjustment of the red component, with brightness adjustment of the green component, and with brightness adjustment of the blue component. Next, the method calculates output image data D' encoded in a vector format, such that $D' = S \times C \times D + B$.

In a preferred embodiment, the method further includes the step of outputting the image data D'. In one embodiment, the values of the saturation matrix S are defined as $S_X = S_{XC} \times S_U$, with $S_{XC}$ equaling a calibration constant and $S_U$ equaling a user adjustment value. In another embodiment, the values of the contrast adjustment matrix C are defined as $C_X = C_{XC} + C_U$, wherein $C_{XC}$ equals a calibration constant and $C_U$ equals a user adjustment value. In one embodiment, the values of the contrast adjustment matrix C are defined as $C_X = C_{XC} \times C_U$, wherein $C_{XC}$ equals a calibration constant and $C_U$ equals a user adjustment value. In another embodiment, the values of the brightness matrix B are defined as, $B_R = B_{RC} + B_{RU}$, $B_G = B_{GC} + B_{GU}$, and $B_B = B_{BC} + B_{BU}$, wherein $B_{RC}$ equals a calibration constant and $B_{RU}$ equals a user adjustment value, wherein $B_{GC}$ equals a calibration constant and $B_{GU}$ equals a user adjustment value, and wherein $B_{BC}$ equals a calibration constant and $B_{BU}$ equals a user adjustment value.

Still further, in accordance with the present invention, there is provided a method for setting the output characteristics of an image rendering device. The method begins by receiving image data vector D having a length n, and encoded relative to selected color space having n components. Next, data representing a selected n by n contrast adjustment matrix C is received. Following the contrast adjustment matrix, data representing a selected n by n saturation adjustment matrix S is received. Then, data representing a selected brightness adjustment vector B having a length of n is received. The method then calculates the output image data D' using the equation: $D' = S \times C \times D + B$.

In one embodiment of the present invention, the method further includes the step of outputting the image data D'. In a preferred embodiment, the values of the matrix S comprise a calibration constant and a user adjustment value. In another embodiment of the present invention, each of the values of the matrix C comprise a calibration constant and a user adjustment value. In one embodiment, each of the values of the matrix B further comprise a calibration constant and a user adjustment value.

Still further, in accordance with the present invention, there is provided a computer-readable medium for instruction with computer readable instructions stored thereon for setting output characteristics of an image rendering device. The computer-readable medium includes instructions to receive image data in a matrix D that is encoded relative to a red-green-blue color space. The computer-readable medium further includes instructions to receive a contrast adjustment matrix C. The values of the contrast adjustment matrix C are constant values associated with a selected contrast adjustment. The computer-readable medium also includes instructions to receive a saturation adjustment matrix S, where the values of the saturation adjustment matrix S are constant values associated with a selected saturation adjustment. The values of the saturation adjustment matrix S also correspond to values of a selected m by n masking matrix A. The computer-readable medium further includes instructions to receive data representing a brightness adjustment matrix B. The values of the brightness adjustment matrix B correspond to values associated with a brightness adjustment of a red component, a blue component and a green component. The computer-readable medium then includes instructions for outputting image data D' encoded in a vector format. The image data D'=S×C×D+B.

Still yet, further, in accordance with the present invention, there is provided a computer-implemented method for setting the output characteristics of an image rendering device. The method includes the step of receiving image data vector D having a length n, and encoded relative to selected color space having n components. Next, the method includes the step of receiving data representing a selected n by n contrast adjustment matrix C. Following the contrast adjustment matrix, data representing a selected n by n saturation adjustment matrix S is received. The method also includes the step of receiving data representing a selected brightness adjustment vector B having a length of n. The method then includes the step of calculating the output image data D' using the equation: D'=S×C×D+B.

These and other aspects, advantages, and features of the present invention will be understood by one of ordinary skill in the art upon reading and understanding the specification.

BRIEF DESCRIPTION OF THE DRAWINGS

The subject invention is described with reference to certain parts, and arrangements to parts, which are evidenced in conjunction with the associated drawings, which form a part hereof and not, for the purposes of limiting the same in which.

DETAILED DESCRIPTION OF THE PREFERRED EMBODIMENT

The present invention is directed to a system and method for performing color adjustments and corrections on color image data. More particularly, this invention is directed to a system and method of saturation, contrast and brightness adjustment by a user that is independent of the calibration of a document processing device. This invention is particularly useful for adjusting and correcting colors in color image data that is to be output on an image processing apparatus.

Figure 1:
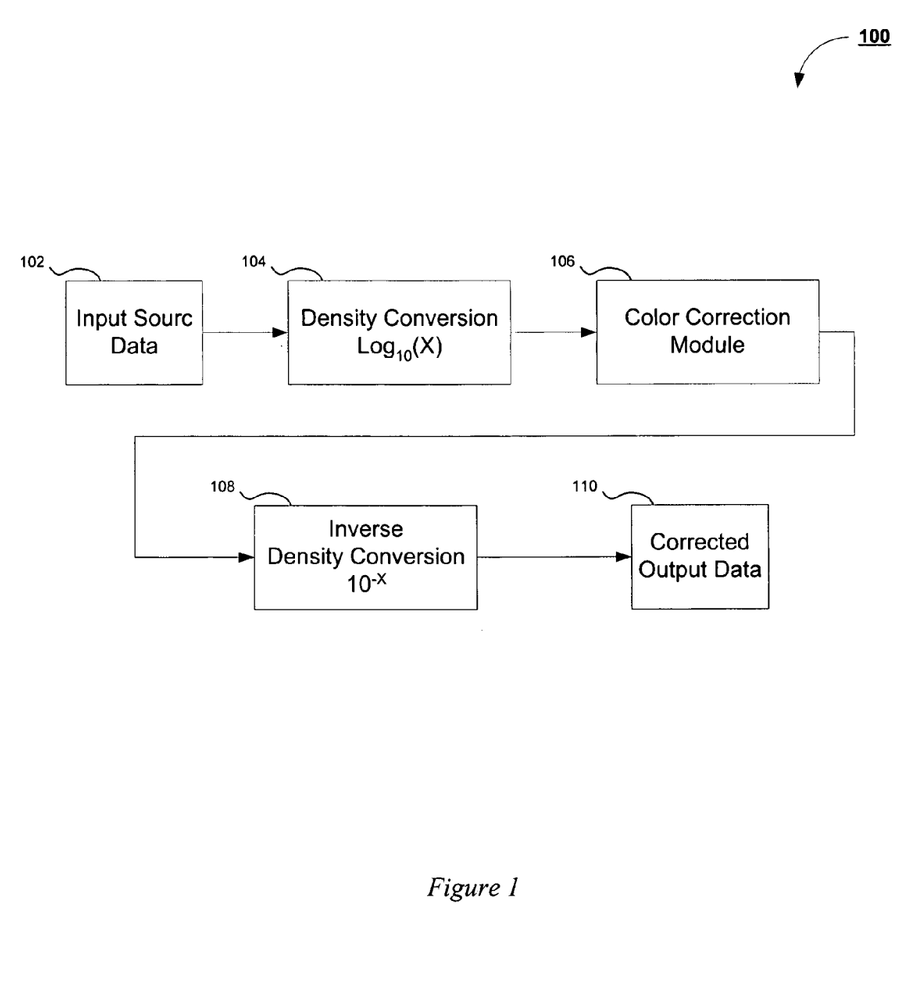
FIG. 1 is a block diagram illustrative of a system of the present invention.

FIG. 1 shows a block diagram of the system according to the present invention generally designated as 100. As shown, the system 100 comprises input source data 102 in the form of scanner or camera input, monitor RGB input, CMYK device input, or the like. As will be understood by those skilled in the art, the input source data suitably includes color space data, such as RGB values, CMYK values, or the like. Also included in the system is the adjusted and corrected output data 110, in the color space of the originally input data 102 color space. It will be appreciated by those skilled in the art that the adjusted output data, while explained herein as being converted back to the original color space is also capable of being converted into an alternate color space. The skilled artisan will also appreciate that the use of the RGB model in the present embodiment is for exemplary purposes and the subject invention is adaptable to use with other input color spaces, without departing from the scope of the subject invention.

The system further includes a density conversion module 104. The density conversion module 104 uses a logarithmic function to ascertain the color densities of each color component of the input data 102. For example:

$Log_{10}(X)$;

where X is a function of the amount of a color component present in an image in a particular color space. The skilled artisan will appreciate that the foregoing simplified equation denotes the conversion from a pure reflectivity space, such as RGB, to density space. It will further be appreciated that any suitable density space known in the art is capable of forming the basis for conversion.

Once the conversion module 104 has converted the input data 102 into density space, a color correction module 106 functions to change the saturation, brightness, contrast, and the like, of the image input data 102. The color correction module 106 includes those software and hardware components, known in the art, suitably adapted to correcting the color of an image and adapted for implementing the subject invention. As set forth in greater detail below, the subject invention resides in the color correction module 106. Upon the completion of the color correction by the color correction module 106, the now corrected input data 102 is now output to an inverse density conversion module 108. It will be understood by those skilled in the art that the corrected image data is still in the density color space and therefore needs to be converted back into its original color space, or into a color space different from the first color space and the density color space. The inverse density conversion module 108 suitably converts the corrected input data 102 into the appropriate corrected output data 110 using an inverse function of the density conversion module 104. For example:

$10^{-X}$ where X is a function of the amount of a color component present in an image in a particular color space.

The subject invention takes advantage of an extension of a traditional masking operation to provide an enhanced ability to set the default saturation, contrast, and brightness of a color printer/copier and provide an easy means to implement user adjustments for these properties. For example, the traditional masking equations are typically implemented using the following matrix:

$$\begin{bmatrix} D'_R \\ D'_G \\ D'_B \end{bmatrix} = \begin{bmatrix} a_{11} & a_{12} & a_{13} \\ a_{21} & a_{22} & a_{23} \\ a_{31} & a_{32} & a_{33} \end{bmatrix} \times \begin{bmatrix} D_R \\ D_G \\ D_B \end{bmatrix}$$

where $D_X$ are the densities in Red, Green, and Blue and the $a_{XY}$ are masking coefficients. The skilled artisan will appreciate that a refinement of the preceding equation requires the conditions:

$a_{11}=1-(a_{12}+a_{13})$, $$a_{22}=1-(a_{21}+a_{23}),$$

$$a_{33}=1-(a_{31}+a_{32}),$$

in order to preserve gray scale balance. The conditions are substituted into the matrix above, resulting in the following:

$$\begin{bmatrix} D'_R \\ D'_G \\ D'_B \end{bmatrix} = \begin{bmatrix} 1-(a_{12}+a_{13}) & a_{12} & a_{13} \\ a_{21} & 1-(a_{12}+a_{23}) & a_{23} \\ a_{31} & a_{32} & 1-(a_{31}+a_{32}) \end{bmatrix} \times \begin{bmatrix} D_R \\ D_G \\ D_B \end{bmatrix}$$

To this equation, the subject invention begins implementation by including saturation adjustments $S_X$ to the masking equation as dimensionless factors. In the preferred embodiment, the saturation factor suitably comprises two components:

$$\begin{bmatrix} D'_R \\ D'_G \\ D'_B \end{bmatrix} = \begin{bmatrix} 1-S_R(a_{12}+a_{13}) & S_R a_{12} & S_R a_{13} \\ S_G a_{21} & 1-S_G(a_{21}+a_{23}) & S_G a_{23} \\ S_B a_{31} & S_B a_{32} & 1-S_B(a_{31}+a_{32}) \end{bmatrix} \times \begin{bmatrix} C_R & C_G & C_B \\ C_R & C_G & C_B \\ C_R & C_G & C_B \end{bmatrix} \times \begin{bmatrix} D_R \\ D_G \\ D_B \end{bmatrix}$$

$$S_X = S_{XC} \times S_U;$$

where $S_{XC}$ is a calibration constant and $S_U$ is a user adjustment value. As shown:

$$\begin{bmatrix} D'_R \\ D'_G \\ D'_B \end{bmatrix} = \begin{bmatrix} 1-S_R(a_{12}+a_{13}) & S_R a_{12} & S_R a_{13} \\ S_G a_{21} & 1-S_G(a_{21}+a_{23}) & S_G a_{23} \\ S_B a_{31} & S_B a_{32} & 1-S_B(a_{31}+a_{32}) \end{bmatrix} \times \begin{bmatrix} D_R \\ D_G \\ D_B \end{bmatrix}$$

Thus, the saturation adjustment is a change in the factor that multiplies the off-diagonal components of the masking matrix.

It will be appreciated by those skilled in the art that the saturation factor is suitably adapted to equal unity for a default image rendering device setup with the off-diagonal coefficients, $a_{XY}$, determined by a calibration/characterization process. To remove the calibration/characterization adjustments to the image rendering device, the skilled artisan will appreciate that a saturation factor of zero is employed. The skilled artisan will understand that in order to determine the raw printer response, negative values of the saturation factor will suitably reduce saturation. In addition, as will be apparent to one skilled in the art, larger negative values result in the de-saturation of the color values, thereby resulting in a monochromatic output.

The diagonal components of the masking matrix, $a_{XX}$, are altered by the saturation factor to maintain a row sum of unity in the masking matrix, thereby maintaining the gray balance within the color correction module 106. It will be appreciated that the maintenance of the gray balance is one advantage of the subject invention and provides a convenient feature during setup of the image rendering device, as well as during user adjustment.

Contrast adjustments, designated as $C_X$, are included as exponents. In the preferred embodiment, the contrast factor suitably comprises two components:

$$C_X = C_{XC} + C_U; \text{ or}$$

$$C_X = C_{XC} \times C_U;$$

where $C_{XC}$ is a calibration constant and $C_U$ is a user adjustment value. In applying the contrast factor, the following equation results:

As will be understood by those skilled in the art, the contrast adjustment is a multiplication of the densities that result from applying the masking matrix. The contrast adjustment is a multiplicative constant in density space. It will be appreciated that the contrast adjustment, as set forth above, does not require a lookup table or an exponential function thereby improving performance. The contrast values suitably vary from zero to greater than unity. In the preferred embodiment, the default value of the contrast factor is unity during the basic setup of the image rendering device output contrast.

The subject invention further includes brightness adjustments, designated $B_X$, in density units for the Red, Green, and Blue color values. The brightness factor can be composed of two components:

$$B_X = B_{XC} + B_U;$$

where $B_{XC}$ is a calibration constant and $B_U$ is a user adjustment value. Application of the brightness factor results in the following equation:

$$\begin{bmatrix} D'_R \\ D'_G \\ D'_B \end{bmatrix} = \begin{bmatrix} 1-S_R(a_{12}+a_{13}) & S_R a_{12} & S_R a_{13} \\ S_G a_{21} & 1-S_G(a_{21}+a_{23}) & S_G a_{23} \\ S_B a_{31} & S_B a_{32} & 1-S_B(a_{31}+a_{32}) \end{bmatrix} \times \begin{bmatrix} C_R & C_G & C_B \\ C_R & C_G & C_B \\ C_R & C_G & C_B \end{bmatrix} \times \begin{bmatrix} D_R \\ D_G \\ D_B \end{bmatrix} + \begin{bmatrix} B_R \\ B_G \\ B_B \end{bmatrix};$$

where the brightness adjustment is an additive constant to the Red, Green, and Blue densities. It will be appreciated by the skilled artisan that the brightness adjustment represents an additive component in the density space, and results in faster performance of the image rendering device than a multiplication in reflectivity space (RGB). The brightness factor is suitably adapted to implementation as either positive or negative and have a default value of zero.

As will be understood by those skilled in the art, the subject application is suitably adaptable to an equivalent implementation in the Cyan, Magenta, and Yellow color space. The skilled artisan need only replace the RGB color space with the CMY color space and make appropriate adjustments to the equations representative of the CMY embodiment of the subject invention. Furthermore, the skilled artisan will appreciate that an alternate embodiment of the CMY embodiment of this invention is suitably implemented using CMYK input/output as well. To enable the adaptation of the CMY embodiment of the subject invention, the K color component is converted to density and the contrast and brightness are applied to it in addition to the application of the saturation, contrast, and brightness adjustments to the CMY color density components.

Figure 2:
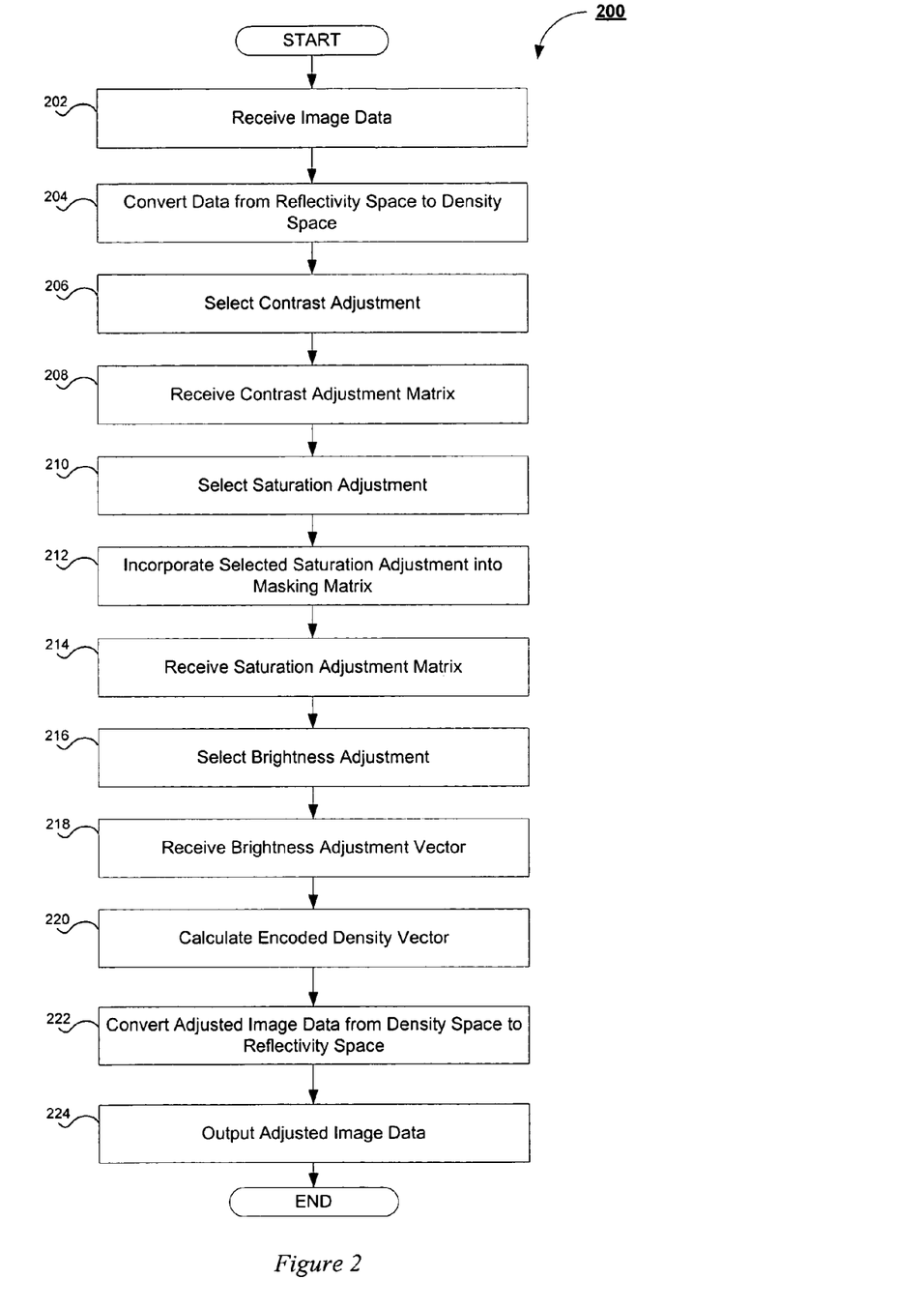
FIG. 2 is a flow chart illustrating the operation of the present invention.

Turning now to FIG. 2, there is illustrated a method 200 of the preferred embodiment of the subject invention. The method 200 begins at 202 by receiving image data in the form of scanner or camera input, monitor RGB input, CMYK device input, or the like. At step 204, the image data, suitably comprising color components, is converted from a first color space, e.g., RGB, to a density color space. Conversion between a reflective colors space and a density color space at step 204 is accomplished using any means known in the art. A user selectively inputs adjustments to the contrast of the image to which the image data corresponds at step 206. At step 208, the user selected contrast adjustment in the form of a contrast adjustment matrix is received by a color correction module. As will be understood by those skilled in the art, the color correction module is any suitable color correction module known in the art suitably adapted for implementing the method of the subject invention.

Next, at step 210, the user selects the saturation adjustment for the image to which the image data corresponds. The selected saturation adjustment is incorporated into a masking matrix at step 212. At step 214, the saturation adjusted masking matrix is received by the color correction module. The user then selects, at step 216, a brightness adjustment for the image to which the input image data corresponds. The brightness adjustment suitably comprises a brightness vector, which is received by the color correction module at step 218. At step 220, adjusted image data is generated using an encoded density vector that is suitably calculated by the color correction module. The encoded density vector is then converted from the density color space to the reflective color space at step 222. At step 224, the adjusted image data is output.

While in the preferred embodiment the present invention is implemented in software, as those skilled in the art can readily appreciate it may also be implemented in hardware or a combination of software and hardware.

Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed is:

1. A system for setting output characteristics of an image rendering device of comprising:

means adapted for receiving image data encoded relative to a red-green-blue color space, the image data being encoded such that, $$D = \begin{bmatrix} D_R \\ D_G \\ D_B \end{bmatrix}$$

wherein $D_R$ is a value associated with a red component of the image data, $D_G$ is a value associated with a green component of the image data and $D_B$ is a value associated with a blue component of the image data;

means adapted for receiving data representative of a saturation adjustment matrix S defined as, $$S = \begin{bmatrix} 1 - S_R(a_{12} + a_{13}) & S_R a_{12} & S_R a_{13} \\ S_G a_{21} & 1 - S_G(a_{21} + a_{23}) & S_G a_{23} \\ S_B a_{31} & S_B a_{32} & 1 - S_B(a_{31} + a_{32}) \end{bmatrix}$$

wherein the values $S_x$ of the matrix S are constant values associated with a selected saturation adjustment for the image data, and wherein the values $a_{mn}$ correspond to values of a selected m by n masking matrix A wherein, $$A = \begin{bmatrix} a_{11} & a_{12} & a_{13} \\ a_{21} & a_{22} & a_{23} \\ a_{31} & a_{32} & a_{33} \end{bmatrix};$$

means adapted for receiving data representative of a contrast adjustment matrix C defined as, $$C = \begin{bmatrix} C_R & C_G & C_B \\ C_R & C_G & C_B \\ C_R & C_G & C_B \end{bmatrix}$$

wherein values of the $C_x$ of the matrix C are constant values associated with a selected contrast adjustment of for image data;

means adapted for receiving data representative of a brightness adjustment matrix B defined as, $$B = \begin{bmatrix} B_R \\ B_G \\ B_B \end{bmatrix}$$

wherein $B_R$ is a value associated with brightness adjustment of the red component, $B_G$ is a value associated with brightness adjustment of the green component, and $B_B$ is a value associated with brightness adjustment of the blue component; and calculation means for outputting image data D' encoded in a vector format of, $$D' = \begin{bmatrix} D'_R \\ D'_G \\ D'_B \end{bmatrix}$$

such that D'=((S×C×D)+B).

2. The system of claim 1, wherein the image rendering device is one of the group consisting of a printer, a scanner, a copier and a multifunction peripheral device.

3. The system of claim 1, wherein the values $S_x$ of the matrix S are defined as, $$S_X = S_{XC} \times S_U,$$

wherein $S_{XC}$ is a calibration constant and $S_U$ is a user adjustment value.

4. The system of claim 1, wherein the values $C_x$ of the matrix C are defined as, $$C_X = C_{XC} + C_U,$$

wherein $C_{XC}$ is a calibration constant and $C_U$ is a user adjustment value.

5. The system of claim 1, wherein the values $C_x$ of the matrix C are defined as, $$C_X = C_{XC} \times C_U,$$

wherein $C_{XC}$ is a calibration constant and $C_U$ is a user adjustment value.

6. The system of claim 1, wherein the values $B_R$, $B_G$, and $B_B$ of the matrix B are defined as, $$B_R = B_{RC} + B_{RU},$$

$$B_G = B_{GC} + B_{GU}, \text{ and}$$

$$B_B = B_{BC} + B_{BU},$$

wherein $B_{RC}$ is a calibration constant and $B_{RU}$ is a user adjustment value, wherein $B_{GC}$ is a calibration constant and $B_{GU}$ is a user adjustment value, and wherein $B_{BC}$ is a calibration constant and $B_{BU}$ is a user adjustment value.

7. A system for setting output characteristics of an image rendering device of comprising:
  means adapted for receiving image data vector D having a length n, and encoded relative to selected color space having n components;
  means adapted for receiving data representative of a selected n by n contrast adjustment matrix C;
  means adapted for receiving data representative of a selected n by n saturation adjustment matrix S;
  means adapted for receiving data representative of a selected brightness adjustment vector B having a length of n; and
  calculation means for outputting image data D' such that D'=((S×C×D)+B).

8. The system of claim 7, wherein the image rendering device is one of the group consisting of a printer, a scanner, a copier and a multifunction peripheral device.

9. The system of claim 7, wherein each of the values of the matrix S further comprise a calibration constant and a user adjustment value.

10. The system of claim 7, wherein each of the values of the matrix C further comprise a calibration constant and a user adjustment value.

11. The system of claim 7, wherein each of the values of the matrix B further comprise a calibration constant and a user adjustment value.

12. A method for setting output characteristics of an image rendering device, the steps comprising:
  receiving image data encoded relative to a red-green-blue color space, the image data being encoded such that, $$D = \begin{bmatrix} D_R \\ D_G \\ D_B \end{bmatrix}$$

wherein $D_R$ is a value associated with a red component of the image data, $D_G$ is a value associated with a green component of the image data and $D_B$ is a value associated with a blue component of the image data;

receiving data representative of a contrast adjustment matrix C defined as, $$C = \begin{bmatrix} C_R & C_G & C_B \\ C_R & C_G & C_B \\ C_R & C_G & C_B \end{bmatrix}$$

wherein values of the $C_x$ of the matrix C are constant values associated with a selected contrast adjustment of for image data;

receiving data representative of a saturation adjustment matrix S defined as, $$S = \begin{bmatrix} 1 - S_R(a_{12} + a_{13}) & S_R a_{12} & S_R a_{13} \\ S_G a_{21} & 1 - S_G(a_{21} + a_{23}) & S_G a_{23} \\ S_B a_{31} & S_B a_{32} & 1 - S_B(a_{31} + a_{32}) \end{bmatrix}$$

wherein the values $S_x$ of the matrix S are constant values associated with a selected saturation adjustment for the image data, and wherein the values $a_{mn}$ correspond to values of a selected m by n masking matrix A wherein, $$A = \begin{bmatrix} a_{11} & a_{12} & a_{13} \\ a_{21} & a_{22} & a_{23} \\ a_{31} & a_{32} & a_{33} \end{bmatrix};$$

receiving data representative of a brightness adjustment matrix B defined as, $$B = \begin{bmatrix} B_R \\ B_G \\ B_B \end{bmatrix}$$

wherein $B_R$ is a value associated with brightness adjustment of the red component, $B_G$ is a value associated with brightness adjustment of the green component, and $B_B$ is a value associated with brightness adjustment of the blue component; and calculating output image data D' encoded in a vector format of, $$D' = \begin{bmatrix} D'_R \\ D'_G \\ D'_B \end{bmatrix}$$

such that D'=((S×C×D)+B).

13. The method of claim 12, wherein the image rendering device is one of the group consisting of a printer, a scanner, a copier and a multifunction peripheral device.

14. The method of claim 12, wherein the values $S_x$ of the matrix S are defined as, $$S_X = S_{XC} \times S_U,$$

wherein $S_{XC}$ is a calibration constant and $S_U$ is a user adjustment value.

15. The method of claim 12, wherein the values $C_x$ of the matrix C are defined as, $$C_X = C_{XC} + C_U,$$

wherein where $C_{XC}$ is a calibration constant and $C_U$ is a user adjustment value.

16. The method of claim 12, wherein the values $C_x$ of the matrix C are defined as, $$C_X = C_{XC} \times C_U,$$

wherein where $C_{XC}$ is a calibration constant and $C_U$ is a user adjustment value.

17. The method of claim 12, wherein the values $B_R$, $B_G$, and $B_B$ of the matrix B are defined as, $$B_R = B_{RC} + B_{RU},$$

$$B_G = B_{GC} + B_{GU}, \text{ and}$$

$$B_B = B_{BC} + B_{BU},$$

wherein $B_{RC}$ is a calibration constant and $B_{RU}$ is a user adjustment value, wherein $B_{GC}$ is a calibration constant and $B_{GU}$ is a user adjustment value, and wherein $B_{BC}$ is a calibration constant and $B_{BU}$ is a user adjustment value.

18. A method for setting output characteristics of an image rendering device of comprising:
   receiving image data vector D having a length n, and encoded relative to selected color space having n components;
   receiving data representative of a selected n by n contrast adjustment matrix C;
   receiving data representative of a selected n by n saturation adjustment matrix S;
   receiving data representative of a selected brightness adjustment vector B having a length of n; and
   calculating output image data D' such that D'=((S×C×D)+B).

19. The method of claim 18, wherein the image rendering device is one of the group consisting of a printer, a scanner, a copier and a multifunction peripheral device.

20. The method of claim 18, wherein each of the values of the matrix S further comprise a calibration constant and a user adjustment value.

21. The method of claim 18, wherein each of the values of the matrix C further comprise a calibration constant and a user adjustment value.

22. The method of claim 18, wherein each of the values of the matrix B further comprise a calibration constant and a user adjustment value.

23. A computer-readable medium of instructions with computer readable instructions stored thereon for setting output characteristics of an image rendering device comprising:
   instructions for receiving image data encoded relative to a red-green-blue color space, the image data being encoded such that, $$D = \begin{bmatrix} D_R \\ D_G \\ D_B \end{bmatrix}$$

wherein $D_R$ is a value associated with a red component of the image data, $D_G$ is a value associated with a green component of the image data and $D_B$ is a value associated with a blue component of the image data;
   instructions for receiving data representative of a contrast adjustment matrix C defined as, $$C = \begin{bmatrix} C_R & C_G & C_B \\ C_R & C_G & C_B \\ C_R & C_G & C_B \end{bmatrix}$$

wherein values of the $C_x$ of the matrix C are constant values associated with a selected contrast adjustment of for image data;
   instructions for receiving data representative of a saturation adjustment matrix S defined as, $$S = \begin{bmatrix} 1 - S_R(a_{12} + a_{13}) & S_R a_{12} & S_R a_{13} \\ S_G a_{21} & 1 - S_G(a_{21} + a_{23}) & S_G a_{23} \\ S_B a_{31} & S_B a_{32} & 1 - S_B(a_{31} + a_{32}) \end{bmatrix}$$

wherein the values $S_x$ of the matrix S are constant values associated with a selected saturation adjustment for the image data, and wherein the values $a_{mn}$ correspond to values of a selected m by n masking matrix A wherein, $$A = \begin{bmatrix} a_{11} & a_{12} & a_{13} \\ a_{21} & a_{22} & a_{23} \\ a_{31} & a_{32} & a_{33} \end{bmatrix};$$

instructions for receiving data representative of a brightness adjustment matrix B defined as, $$B = \begin{bmatrix} B_R \\ B_G \\ B_B \end{bmatrix}$$

wherein $B_R$ is a value associated with brightness adjustment of the red component, $B_G$ is a value associated with brightness adjustment of the green component, and $B_B$ is a value associated with brightness adjustment of the blue component; and
   instructions for calculating output image data D' encoded in a vector format of, $$D' = \begin{bmatrix} D'_R \\ D'_G \\ D'_B \end{bmatrix}$$

such that D'=((S×C×D)+B).

24. A computer-readable medium of instructions with computer readable instructions stored thereon for color correction comprising for setting output characteristics of an image rendering device of comprising:
- instructions for receiving image data vector D having a length n, and encoded relative to selected color space having n components;
- instructions for receiving data representative of a selected n by n contrast adjustment matrix C;
- instructions for receiving data representative of a selected n by n saturation adjustment matrix S;
- instructions for receiving data representative of a selected brightness adjustment vector B having a length of n; and
- instructions for calculating output image data D' such that D'=((S×C×D)+B).

25. A computer-implemented method for setting output characteristics of an image rendering device comprising:
- receiving image data encoded relative to a red-green-blue color space, the image data being encoded such that, $$D = \begin{bmatrix} D_R \\ D_G \\ D_B \end{bmatrix}$$

wherein $D_R$ is a value associated with a red component of the image data, $D_G$ is a value associated with a green component of the image data and $D_B$ is a value associated with a blue component of the image data;
- receiving data representative of a contrast adjustment matrix C defined as, $$C = \begin{bmatrix} C_R & C_G & C_B \\ C_R & C_G & C_B \\ C_R & C_G & C_B \end{bmatrix}$$

wherein values of the $C_x$ of the matrix C are constant values associated with a selected contrast adjustment of for image data;
- receiving data representative of a saturation adjustment matrix S defined as, $$S = \begin{bmatrix} 1-S_R(a_{12}+a_{13}) & S_R a_{12} & S_R a_{13} \\ S_G a_{21} & 1-S_G(a_{21}+a_{23}) & S_G a_{23} \\ S_B a_{31} & S_B a_{32} & 1-S_B(a_{31}+a_{32}) \end{bmatrix}$$

wherein the values $S_x$ of the matrix S are constant values associated with a selected saturation adjustment for the image data, and wherein the values $a_{mn}$ correspond to values of a selected m by n masking matrix A wherein, $$A = \begin{bmatrix} a_{11} & a_{12} & a_{13} \\ a_{21} & a_{22} & a_{23} \\ a_{31} & a_{32} & a_{33} \end{bmatrix};$$

receiving data representative of a brightness adjustment matrix B defined as, $$B = \begin{bmatrix} B_R \\ B_G \\ B_B \end{bmatrix}$$

wherein $B_R$ is a value associated with brightness adjustment of the red component, $B_G$ is a value associated with brightness adjustment of the green component, and $B_B$ is a value associated with brightness adjustment of the blue component; and
- calculating output image data D' encoded in a vector format of, $$D' = \begin{bmatrix} D'_R \\ D'_G \\ D'_B \end{bmatrix}$$

such that D'=((S×C×D)+B).

26. A computer-implemented method for setting output characteristics of an image rendering device of comprising the steps of:
- receiving image data vector D having a length n, and encoded relative to selected color space having n components;
- receiving data representative of a selected n by n contrast adjustment matrix C;
- receiving data representative of a selected n by n saturation adjustment matrix S;
- receiving data representative of a selected brightness adjustment vector B having a length of n; and
- calculating output image data D' such that D'=((S×C×D)+B).

* * * * *